POLYPHENYLENE ETHER RESIN COMPOSITIONS CONTAINING POLYPENTENAMER

This invention relates to improved compositions of a polyphenylene ether resin containing polypentenamer. Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration certain of the polyphenylene ethers are disclosed in Hay, U.S. Pat. Nos. 3,306,874 and 3,306,875, and in Stamatoff, U.S. Pat. Nos. 3,257,357 and 3,256,358. In the Hay patents, the polyphenylene ethers are prepared by an oxidative coupling reaction comprising passing any oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al., U.S. Pat. Nos. 3,337,892; Blanchard et al., 3,219,626; Laakso et al., 3,342,892; Borman, 3,344,116; Hori et al., 3,384,619; Faurote et al., 3,440,217; and Cooper et al., 3,661,848, 3,733,299, 3,383,102, and 3,988,297. Disclosures relating to metal based catalysts which do not include amines, are known from patents such as Wieden et al., U.S. Pat. Nos. 3,442,885 (copper-amidines); Nakashio et al., 3,573,257 (metal-alcholate or -phenolate); Kobyashi et al., 3,445,880 (cobalt chelates); and the like. In the Stamatoff patent, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead oxide, silver oxide, etc., are described in Price et al., U.S. Pat. No. 3,383,212. Cizek, U.S. Pat. No. 3,383,435 discloses polyphenylene ether-styrene resin compositions. All of the above-mentioned disclosures are incorporated by reference.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers are improved.

The conventional polymerization of conjugated dienes yields rubber with the structure (CH=CH—(CH$_2$)$_2$)$_x$, with two methylene groups between each double bond. Recent development of procedures for ring-opening polymerization of cycloolefins has made it possible to prepare polyalkenamers having the general structure (CH=CH—(CH$_2$)$_n$)$_x$ where n represents the number of carbon atoms in the cycloolefin ring, minus two. One of the polyalkenamers is of particular interest. It has been found that polyphenylene ether resin compositions containing polypentenamer have improved impact strength.

It is, therefore, a primary object of this invention to provide improved compositions that are based on polyphenylene ether resins containing polypentenamer.

Another object of this invention is to provide molding compositions and molded articles that are based on a polyphenylene ether resin and polypentenamer and that overall have improved impact strength.

It is also an object of this invention to provide the above-described, improved imolding compositions in reinforced and/or flame-retardant embodiments.

DESCRIPTION OF THE INVENTION

The above-mentioned advantages and objects and others will be readily apparent to those skilled in the art by the following compositions.

The compositions of this invention are comprised of:
(a) a polyphenylene ether resin, and
(b) polypentenamer.

The compositions of this invention are also comprised of:
(a) a polyphenylene ether resin;
(b) a rubber-modified alkenyl aromatic resin; and
(c) polypentenamer.

The compositions of this invention are further comprised of:
(a) a polyphenylene ether resin; and
(b) an alkenyl aromatic resin modified with polypentenamer.

The preferred polyphenylene ethers are of the formula

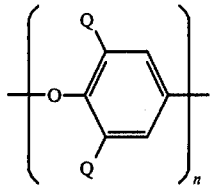

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydroxcarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene) ether.

Polypentenamer is produced by a ring expansion polymerization of cyclopentene. For example, the ring expansion polymerization of cyclopentene results in a polymer of formula

wherein m is at least 30. See, for example, "Rubber Reviews For 1974", Rubber Chemistry and Technology, Vol. 47, pages 511–596.

United States Patent [19]

Cooper et al.

[11] 4,164,493

[45] Aug. 14, 1979

[54] POLYPHENYLENE ETHER RESIN COMPOSITIONS CONTAINING POLYPENTENAMER

[75] Inventors: Glenn D. Cooper; Arthur Katchman, both of Delmar; Charles P. Shank, Averill Park, all of N.Y.

[73] Assignee: General Electric Company, Pittsfield, Mass.

[21] Appl. No.: 939,205

[22] Filed: Sep. 5, 1978

[51] Int. Cl.$^2$ .............................................. C08L 71/04
[52] U.S. Cl. .......................... 260/42.18; 260/45.7 R; 260/45.9 NP; 260/45.7 P; 260/45.75 B; 260/42.17; 525/132; 525/68; 525/151
[58] Field of Search .................. 260/874, 896, 897 R, 260/876 R

[56] References Cited

U.S. PATENT DOCUMENTS

| | | | |
|---|---|---|---|
| 3,383,435 | 5/1968 | Cizek | 260/901 |
| 3,639,499 | 2/1972 | Snodgrass et al. | 260/874 X |
| 3,660,531 | 5/1972 | Lauchlan et al. | 260/874 |
| 3,763,027 | 10/1973 | Hombach et al. | 260/27 R |

OTHER PUBLICATIONS

"Rubber Reviews" 1974, Rubber Chemistry and Technology, vol. 47, pp. 511-596.

*Primary Examiner*—Carman J. Seccuro
*Attorney, Agent, or Firm*—Morgan, Finnegan, Pine, Foley & Lee

[57] ABSTRACT

Novel compositions are disclosed which comprise a polyphenylene ether resin and polypentenamer. Also disclosed are compositions comprised of a polyphenylene ether resin, a rubber-modified alkenyl aromatic resin, and polypentenamer as well as compositions comprised of a polyphenylene ether resin and an alkenyl aromatic resin modified with polypentenamer. Included within the scope of this invention are corresponding reinforced and flame-retardant compositions.

38 Claims, No Drawings and (b) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70 to 80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 and 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art. It is also a feature of this invention to provide flame-retardant thermoplastic compositions, as defined above, by modifying the compositions to include a flame-retardant additive in a minor proportion but in an amount at least sufficient to render the compositions non-burning or self-extinguishing. The flame-retardant additives useful in this invention comprise a family of chemical compounds well known to those skilled in the art. Such flame-retardant additives include a halogenated organic compound, a halogenated organic compound in admixture with an antimony compound, elemental phosphorus, a phosphorus compound, compounds containing phosphorus-nitrogen bonds, or a mixture of two or more of the foregoing.

Among the helpful halogen-containing compounds are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octobromobiphenyl, decabromobiphenyl, and halogenated diphenyl ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, halogenated diphenyl ethers, or mixtures of at least two of the foregoing.

Especially preferred are decabromodiphenyl ether or hexabromodiphenyl ether, alone or mixed with antimony oxide.

The preferred phosphates are trixylylphosphate, tert-butyl-phenyldiphenyl phosphate, and triphenyl phosphate. It is also preferred to use triphenyl phosphate in combination with decabromodiphenyl ether and, optionally, antimony oxide. Especially preferred is a composition comprised of mixed triaryl phosphates with one or more isopropyl groups on some or all of the aryl rings, such as Kronitex 50 supplied by Food Machinery Corporation.

Other flame-retardant additives are known to those skilled in the art. See, for example, Cooper et al., U.S. Pat. No. 3,943,191, incorporated herein by reference.

In general, however, the amount of additive will be from about 0.5 to 50 percent by weight based on the total weight of the composition. A preferred range will be from about 1 to 25 percent by weight, and an especially preferred range will be from about 3 to 15 percent by weight. Smaller amounts of compounds highly concentrated in the elements responsible for flame-retardance with be sufficient, e.g., elemental red phosphorus will be preferred at about 0.5 to 10 percent by weight based on the weight of the total composition, while phosphorus in the form of triphenyl phosphate will be used at about 3 to 25 percent by weight, and so forth. Halogenated aromatics will be used at about 2 to 20 percent by weight, and synergists, e.g., antimony oxide, will be used at about 1 to 10 percent by weight based on the total weight of the composition.

The compositions of the invention may be formed by conventional techniques, that is, by first dry mixing the components to form a premix, and then passing the premix through an extruder at an elevated temperature, e.g., 425° to 640° F. Compounding should be carried out to insure that the residence time in the machine is short; that the temperature is carefully controlled; that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLE I

A composition comprising a 78:22 ratio of polyphenylene ether resin (PPO) to triphenyl phosphate was prepared by mixing 585 g of PPO, 165 g of triphenyl phosphate, 3.8 g of tridecyl phosphite, 1.1 g of zinc sulfide, and 1.1 g of zinc oxide and then extruding the mixture with a 28 mm twin-screw extruder. The extruded pellets were then molded into standard test pieces on a 3 oz. Newbury screw injection molding machine.

PPO and polypentenamer (80% trans, 20% cis, available from Goodyear Tire and Rubber Co.) were dissolved in toluene and coprecipitated with methanol to yield a product comprised of 90% by weight PPO and 10% by weight polypentenamer. Three hundred grams of the coprecipitated composition, 170 g of PPO, 124 g of triphenyl phosphate, 2.85 g of tridecyl phosphite, 0.8 g of zinc sulfide, and 0.8 zinc oxide were mixed together to form a mixture having approximately the same ratio of PPO to triphenyl phosphate as the first composition. The mixture was extruded and standard test pieces were formed as above.

Physical properties of the composition were as follows:

| PROPERTY | CONTROL | EXAMPLE I* |
|---|---|---|
| Elongation (%) | 77 | 82 |
| Tensile Yield (psi) | 10,500 | 9,600 |
| Tensile Strength (psi) | 8,600 | 9,400 |
| Izod Impact (ft. lbs./in.) | 0.8 | 3.1 |
| Gardner Impact (in. lbs.) | 30 | 225 |
| Heat Distortion Temp. (°F.) | 188 | 200 |

*Containing 6.2 parts of polypentenamer per hundred pats of PPO plus polypentenamer.

It can be seen from the above that the composition containing polypentenamer had improved properties, particularly impact strength, as compared to the control.

EXAMPLE II

A 35:65 composition of PPO and rubber-modified polystyrene was prepared as described in Example I, from 350 g of PPO, 650 g of FG-834 (a polybutadiene-modified polystyrene available from Foster Grant Co.), 70 g of triphenyl phosphate, 5 g of tridecyl phosphite, 1.5 g of zinc sulfide, and 1.5 g of zinc oxide. A second composition having the same ratio of PPO to polystyrene was prepared from 350 g of a 90:10 coprecipitated PPO and polypentenamer mixture, 540 g of FG-834, 62.3 of triphenyl phosphate, 4.5 g of tridecyl phosphite, 1.3 g of zinc sulfide, and 1.3 g of zinc oxide. The composition made without polypentenamer had Izod impact strength of 5.6 ft.lbs./in.; the composition containing 3.9 phr of polypentenamer had Izod impact strength of 7.6 ft.lbs./in.

EXAMPLE III

One hundred grams of polypentenamer was dissolved in 1150 g of styrene, 1.2 g of tert-butyl peracetate was added, and the solution was transferred to a one gallon stainless steel reactor, stirred by a 3⅛" by ¼" six blade turbine stirrer. The mixture was stirred at 800 rpm and heated at 100° C. After three hours at this temperature 8 g of tert-butyl peroxide was added, and the mixture was suspended in 1500 ml of water containing 4 g of poly(vinyl alcohol) and 3 g of gelatin. Polymerization was completed by heating the suspension for one hour at 100° C., two hours at 120° C., one hour at 140° C., and then 2½ hours at 155° C. The mixture was cooled, and the beads of modified polystyrene were filtered off, washed with water, and dried.

EXAMPLE IV

One hundred grams of polypentenamer and 900 g of polystyrene were polymerized as described in Example III.

EXAMPLE V

One hundred grams of polypentenamer and 900 g of polystyrene were polymerized by the procedure described in Example III, except that the stirrer speed was increased to 1600 rpm. After three hours at 100° C., 100 g of PPO (I.V.=0.38 dl/g) was added. The solution was stirred for 15 minutes and then suspended, and the polymerization was completed by the heating schedule described in Example III.

EXAMPLE VI

Polymerization was carried out as described in Example V, except that the PPO was added immediately after the beginning of the reaction, as soon as the reaction temperature reached 90° C. The reactor was then sealed and the temperature was increased to 100° C. After three hours at this temperature, the mixture was suspended, and polymerization completed as described in Example III.

The polymers prepared according to Examples III to VI were evaluated for particle size, gel content, and swell index by use of the procedures described in commonly assigned, U.S. patent application Ser. No. 787,253, filed Apr. 13, 1977, incorporated herein by reference. The results were as follows:

Table 2

| Example | Polypentenamer (% by weight) | PPO Added | Particle Size (microns) | Gel (%) | Swell Index |
|---|---|---|---|---|---|
| III | 8 | None | 1.1 | 30.5 | 11.6 |
| IV | 10 | None | 1.1 | 34.9 | 7.6 |
| V | 10 | After Phase Inversion | 1.1 | 21.7 | 10.4 |
| VI | 10 | Before Phase Inversion | 4.0 | 32.2 | 12.7 |

EXAMPLE VII

Three hundred grams of the polymer produced in Example III, 200 g of PPO, 6 g of tridecyl phosphite, 18 g of triphenyl phosphate, 0.9 g of zinc sulfide, and 0.9 g of zinc oxide were mixed and extruded at 575° F. in a 28 mm twin-screw extruder. The pellets were molded at 500° F. into standard test pieces in a screw injection molding machine. The polymers produced in Examples IV, V, and VI were similarly extruded and molded, except that with the polymers of Examples V and VI the quantities were changed to 224 g of PPO and 276 g of polystyrene to maintain the same PPO-polystyrene ratio as in Example IV. Properties of the compositions are listed in Table 3.

Table 3

| Example | Elongation (%) | Tensile Yield (psi) | Tensile Strength (psi) | Izod Impact (ft.lbs./in) | Gardner Impact (in.lbs.) |
|---|---|---|---|---|---|
| III | 55 | 11,800 | 8,200 | 1.2 | 175 |
| IV | 56 | 10,800 | 9,200 | 1.7 | 275 |
| V | 50 | 11,000 | 8,400 | 4.1 | 275 |
| VI | 69 | 11,200 | 9,500 | 1.8 | 125 |

As shown in Table 3, the composition of Example V, wherein PPO was added after phase inversion, had the best impact strength.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. A thermoplastic composition which, after molding has good impact strength, said composition comprising:
   (a) from about 1 to 99 parts by weight of a polyphenylene ether resin, and
   (b) from about 1 to 99 parts by weight of polypentenamer, based on the total weight of the composition.

2. The molding composition of claim 1 wherein the polyphenylene ether resin is selected from the compounds of the formula

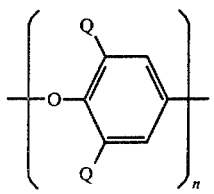

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

3. The molding composition of claim 1 wherein the polyphenylene ether resin is poly(2,6-dimethyl-1,4-phenylene) ether.

4. A thermoplastic composition which, after molding has good impact strength, said composition comprising:
   (a) from about 1 to 99 parts by weight of a polyphenylene ether resin;
   (b) from about 1 to 99 parts by weight of polypentenamer, based on the total weight of the composition; and
   (c) a reinforcing amount of an inorganic reinforcing filler.

5. The molding composition of claim 4 wherein the polyphenylene ether resin is poly(2,6-dimethyl-1,4-phenylene) ether.

6. The molding composition of claim 4 wherein the reinforcing filler comprises from 10 to 80% of fibrous glass filaments, based on the total weight of the composition.

7. A thermoplastic composition which, after molding, has good impact strength, said composition comprising:
   (a) from about 1 to 99 parts by weight of polyphenylene ether resin;
   (b) from about 1 to 99 parts by weight of a polypentenamer, based on the total weight of the composition; and
   (c) a flame-retardant amount of a flame-retardant additive.

8. The molding composition of claim 7 wherein the flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

9. The molding composition of claim 7 wherein the flame-retardant additive comprises a mixture of an organic bromine-containing compound with antimony oxide.

10. The molding composition of claim 7 wherein the flame-retardant additive is selected from trixylylphosphate, tert-butylphenyldiphenyl phosphate, and triphenylphosphate.

11. The molding composition of claim 7 wherein the flame-retardant additive is comprised of a mixture of triaryl phosphates wherein one or more aryl groups are substituted by one or more isopropyl groups.

12. A thermoplastic composition which, after molding has good impact strength, said composition comprising:
   (a) from about 10 to 90 parts by weight of a polyphenylene ether resin;
   (b) from about 90 to 10 parts by weight of an alkenyl aromatic resin modified with diene rubber by polymerizing alkenyl aromatic monomer in the presence of the diene rubber;
   (c) from about 1 to 50 parts by weight of polypentenamer, based on the total weight of of the composition.

13. The molding composition of claim 12 wherein the alkenyl aromatic resin is prepared from a monomer selected form the group consisting of styrene, $\alpha$-methylstyrene, bromostyrene, chlorostyrene, divinylbenzene, and vinyltoluene.

14. The molding composition of claim 12 wherein the alkenyl aromatic resin is modified with a rubbery polymer of butadiene.

15. The molding composition of claim 12 wherein the polyphenylene ether resin is poly(2,6-dimethyl-1,4-phenylene) ether.

16. The molding composition of claim 12 wherein the alkenyl aromatic resin is polystyrene and the diene rubber is present between about 4% and about 75% by weight of polystyrene and diene rubber combined.

17. A thermoplastic composition which, after molding has good impact strength, said composition comprising:
   (a) from about 10 to 90 parts by weight of a polyphenylene ether resin;
   (b) from about 90 to 10 parts by weight of an alkenyl aromatic resin modified with diene rubber by polymerizing alkenyl aromatic monomer in the presence of the diene rubber;
   (c) from about 1 to 50 parts by weight of polypentenamer, based on the total weight of the composition; and
   (d) a reinforcing amount of an inorganic reinforcing filler.

18. The molding composition of claim 17 wherein said polyphenylene ether resin is poly(2,6-dimethyl-1,4-phenylene) ether.

19. The molding composition of claim 17 wherein said reinforcing filler comprises from 10 to 80% of fibrous glass filaments, based on the total weight of the composition.

20. A thermoplastic composition which, after molding, has good impact strength, said composition comprising:
   (a) from about 10 to 90 parts by weight of a polyphenylene ether resin;
   (b) from about 90 to 10 parts by weight of an alkenyl aromatic resin modified with diene rubber by polymerizing alkenyl aromatic monomer in the presence of the diene rubber;
   (c) from about 1 to 50 parts by weight of polypentenamer, based on the total weight of the composition; and
   (d) a flame-retardant amount of a flame-retardant additive.

21. The molding composition of claim 20 where in the flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

22. The molding composition of claim 20 wherein the flame-retardant additive comprises a mixture of an organic bromine-containing compound with antimony oxide.

23. The molding composition of claim 20 wherein the flame-retardant additive is selected from trixylylphosphate, tert-butylphenyldiphenyl phosphate, and triphenylphosphate.

24. The molding composition of claim 20 wherein the flame-retardant additive is comprised of a mixture of triaryl phosphates wherein one or more aryl groups are substituted by one or more isopropyl groups.

25. A thermoplastic composition which, after molding has good impact strength, said composition comprising:
   (a) from about 10 to 99 parts by weight of a polyphenylene ether resin; and
   (b) from about 1 to 90 parts by weight of an alkenyl aromatic resin modified with polypentenamer by polymerizing alkenyl aromatic monomer in the presence of the polypentenamer, based on the total weight of the composition.

26. The molding composition of claim 25 wherein the alkenyl aromatic resin is prepared from a monomer selected from the group consisting of styrene, α-methylstyrene, bromostyrene, chlorostyrene, divinylbenzene, and vinyltoluene.

27. The molding composition of claim 25 wherein the polyphenylene ether resin is poly(2,6-dimethyl-1,4-phenylene) ether.

28. The molding composition of claim 25 wherein the alkenyl aromatic resin is polystyrene and the polypentenamer is present between about 4% and about 25% by weight of polystyrene and polypentenamer combined.

29. A thermoplastic composition which, after molding has good impact strength, said composition comprising:
   (a) from about 10 to 99 parts by weight of a polyphenylene ether resin;
   (b) from about 1 to 90 parts by weight of an alkenyl aromatic resin modified with polypentenamer, by polymerizing alkenyl aromatic monomer in the presence of the polypentenamer based on the total weight of the composition; and
   (c) a reinforcing amount of an inorganic reinforcing filler.

30. The molding composition of claim 29 wherein the polyphenylene ether resin is poly(2,6-dimethyl-1,4-phenylene) ether.

31. The molding composition of claim 29 wherein the reinforcing filler comprises from 10 to 80% of fibrous glass filaments, based on the total weight of the composition.

32. A thermoplastic composition which, after molding, has good impact strength, said composition comprising:
   (a) from about 10 to 99 parts by weight of a polyphenylene ether resin;
   (b) from about 1 to 90 parts by weight of an alkenyl aromatic resin modified with polypentenamer, by polymerizing alkenyl aromatic monomer in the presence of the polypentenamer based on the total weight of the composition; and
   (c) a flame-retardant amount of a flame-retardant additive.

33. The molding composition of claim 32 wherein the flame-retardant additive is a halogenated organic compound, a halogenated organic compound in admixture with an antimony compound, elemental phosphorus compound, compounds containing phosphorus-nitrogen bonds, or a mixture of two or more of the foregoing.

34. The molding composition of claim 32 wherein the flame-retardant additive comprises a mixture of an organic bromine-containing compound with antimony oxide.

35. The molding composition of claim 32 wherein the flame-retardant additive is selected from trixylylphosphate, tert-butylphenyldiphenyl phosphate, and triphenylphosphate.

36. The molding composition of claim 32 wherein the flame-retardant additive is comprised of a mixture of triaryl phosphates wherein one of more aryl groups are substituted by one or more isopropyl groups.

37. A process for the preparation of a thermoplastic composition which, after molding, has good impact strength, comprising the steps of:
   (a) initiating suspension polymerization of an alkenyl aromatic monomer in the presence of polypentenamer.
   (b) after phase inversion adding a small amount of polyphenylene ether resin to the reaction mixture;
   (c) completing the polymerization;
   (d) recovering the polymer produced; and
   (e) extruding the product of step (d) with additional polyphenylene ether resin.

38. The thermoplastic molding composition prepared according to claim 37.

* * * * *